United States Patent
Harding

(10) Patent No.: US 9,418,214 B1
(45) Date of Patent: Aug. 16, 2016

(54) ANONYMOUS BIOMETRIC ENROLLMENT

(71) Applicant: ImageWare Systems, Inc., San Diego, CA (US)

(72) Inventor: David Harding, Portland, OR (US)

(73) Assignee: ImageWare Systems, Inc., San Diego, CA (US)

( * ) Notice: Subject to any disclaimer, the term of this patent is extended or adjusted under 35 U.S.C. 154(b) by 316 days.

(21) Appl. No.: 13/633,372

(22) Filed: Oct. 2, 2012

Related U.S. Application Data

(60) Provisional application No. 61/567,591, filed on Dec. 6, 2011, provisional application No. 61/567,595, filed on Dec. 6, 2011, provisional application No. 61/567,599, filed on Dec. 6, 2011.

(51) Int. Cl.
*G06F 21/32* (2013.01)

(52) U.S. Cl.
CPC .................................... *G06F 21/32* (2013.01)

(58) Field of Classification Search
CPC . G06K 9/00006; G07C 9/00071; G06F 21/32
USPC ......... 340/572.1, 572.4, 5.52, 5.53, 5.6, 5.82, 340/10.1; 382/124, 125; 348/208.14, 231.2; 705/2, 3; 726/9; 713/185, 186
See application file for complete search history.

(56) References Cited

U.S. PATENT DOCUMENTS

| | | | |
|---|---|---|---|
| 6,292,092 B1 * | 9/2001 | Chow et al. ................... 340/5.6 |
| 6,498,861 B1 * | 12/2002 | Hamid et al. ................ 382/124 |
| 8,269,857 B2 * | 9/2012 | Ishizaka ..................... 348/231.2 |
| 8,289,135 B2 * | 10/2012 | Griffin ......................... 340/5.82 |
| 8,508,339 B2 * | 8/2013 | Griffin ......................... 340/5.82 |
| 8,571,276 B2 * | 10/2013 | Vitt et al. ..................... 382/125 |
| 8,887,259 B1 * | 11/2014 | Harding ........................... 726/9 |
| 9,262,613 B1 * | 2/2016 | Harding ................ G06F 21/32 |
| 2002/0112177 A1 * | 8/2002 | Voltmer et al. ............... 713/200 |
| 2005/0154627 A1 * | 7/2005 | Zuzek et al. .................... 705/10 |
| 2008/0052527 A1 * | 2/2008 | Siedlarz ................ G06F 21/32 713/186 |
| 2013/0318359 A1 * | 11/2013 | Morris et al. ................. 713/185 |

\* cited by examiner

*Primary Examiner* — Van Trieu
(74) *Attorney, Agent, or Firm* — San Diego IP Law Group LLP

(57) ABSTRACT

In the present invention systems and methods to perform the biometric anonymous enrollment of an individual into an anonymous biometric engine are disclosed. An enrollment authority or client verifies the credentials of an individual and collects the biographic/demographic and biometric information. The biographic demographic information is stored by the enrollment authority and a token is generated for the individual; the biometric information and the token are sent to a biometric engine for storage. The stored information may be used to identify or verify individuals.

28 Claims, 10 Drawing Sheets

ANONYMOUS BIOMETRIC ENROLLMENT

CROSS-REFERENCE TO RELATED APPLICATIONS

The present application claims priority under 35 U.S.C. §119 to U.S. Provisional Patent Application No. 61/567,591, filed on Dec. 6, 2011, entitled "Anonymous Biometric Verification System"; U.S. Provisional Patent Application No. 61/567,595, filed on Dec. 6, 2011, entitled "Anonymous Biometric Enrollment System"; and U.S. Provisional Patent Application No. 61/567,599, filed on Dec. 6, 2011, entitled "Anonymous Biometric Identification System"; the disclosures of all of which are incorporated by reference in their entirety.

BACKGROUND OF THE INVENTION

1. Field of Invention

This invention relates generally to the field of biometric authentication and identification, and more specifically to anonymous biometric identity management and verification without knowledge of biographic, demographic or otherwise identifying information.

2. Description of Related Art

The need to establish personal identity occurs, for most individuals, many times a day. For example, a person may have to establish identity in order to gain access to, physical spaces, computers, bank accounts, personal records, restricted areas, reservations, and the like. Identity is typically established by a physical object such as, but not limited to a key, driver license, bank card, credit card; known information such as, but not limited to a computer password, personal identification number (PIN) number; and/or a unique and measurable biological feature such as, but not limited to a face recognized by a bank teller or security guard. From a security standpoint, identification based on a biological (or behavioral) feature is often favored because it can be objectively and automatically measured and is resistant to impersonation, theft, or other fraud. The use of biometrics, which are measurements derived from human biological features, to identify individuals is a rapidly emerging science.

Biometrics is a generic term for characteristics that can be used to distinguish one individual from another, particularly through the use of digital equipment such as a computer. An example of a biometric is a fingerprint. Trained analysts have long been able to match fingerprints in order to identify individuals. More recently, computer systems have been developed to match fingerprints automatically. Examples of biometrics that have been, or are now being, used to identify, or authenticate the identity of, individuals include two-dimensional (2D) face, three-dimensional (3D) face, hand geometry, single fingerprint, ten finger live scan, iris, palm, full hand, signature, ear, finger vein, retina, DNA, and voice. Other biometric may include characteristic gaits, lip movements, and the like. New biometric are being developed or discovered continually.

The implementation of a biometrics system requires the coordination between the individual providing the biometrics and the organization or business implementing the respective biometrics technology. Generally, the implementation of a biometrics system requires the individual to undergo an initial enrollment process. This means that one or more sample biometric measurements are provided by the individual, along with personal identifying, demographic information, such as, for example, name, address, telephone number, an identification number (e.g., a social security number), a bank account number, a credit card number, a reservation number, or some other information unique to that individual. The sample biometric measurements are stored along with this personal identification data in a database.

Following this initial enrollment process whereby the individual's biographic information is stored with the associated initial biometric sample, the individual that seeks verification at a subsequent time submits a second biometric sample (or multiple samples), along with some personal identifying information, such as described above, that is unique to that person. The personal identifying information is used to retrieve the individual's initial sample biometric from the database. This first sample is compared to the second sample, and if the samples are judged to match by some criteria specific to the biometric technology, then the individual is authenticated.

A second form of biometric authentication is identification. Like the verification case, the individual must be enrolled in a biometric database where each record includes a first biometric sample and accompanying personal identifying information which are intended to be released when authentication is successful. In order to be authenticated the individual submits only a second biometric sample, but no identifying information. The second biometric sample is compared against all first biometric samples in the database and a single matching first sample is found by applying a match criteria. The advantage of this second form of authentication is that the individual need not remember or carry the unique identifying information required in the verification method to retrieve a single first biometric sample from the database.

A common security problem within the above biometric identification and authentication techniques is the requirement of a central database of personal biographic and/or demographic information which is usually revealed at the moment of biometric matching and sampling. For example, personal information of the individual undergoing identification or authentication may be disclosed that is otherwise intended to be kept private. Thus, there exists the need of a new biometric verification technique that overcomes privacy concerns associated with this database containing personal identifying biographic/demographic information.

SUMMARY OF THE INVENTION

The present invention overcomes these and other deficiencies of the prior art by providing an anonymous biometric enrollment system and method that confirms the biometric identity of a subject individual without knowledge and/or disclosure of any biographic, demographic, or otherwise identifying information of that individual.

In an embodiment of the invention, a method of biometrically enrolling an individual comprises: receiving at a query engine a biometric probe from the individual and a token associated with the individual; creating a biometric template based on the biometric probe; and storing the biometric template in association with the token; wherein the biometric token is a unique identifier which carries no demographic or biographic information. The method may further comprise transmitting a notification indicative of whether the creating a biometric template failed or succeeded. The biometric probe and biometric template may be based on facial recognition, iris recognition, and/or fingerprint recognition. In addition, the biometric probe and the biometric template may be based on hand geometry recognition, ten finger live scan, palm recognition, full hand recognition, signature recognition, ear recognition, finger vein recognition, retina recognition, voice recognition, DNA-based recognition or a combination thereof. The method may further comprise receiving by a query router at least one biometric probe and a token; selecting a query engine; transmitting the biometric probe to the query engine; receiving the notification from the query engine; and transmitting the notification to a non-anonymous sector. The method may further comprise performing a duplicity check on the biometric probe; sending a list of best matching tokens; receiving a decision whether to complete or cancel enrollment; and discarding the biometric template if a cancel enrollment is received. The method may further comprise receiving by a query router at least one biometric probe and a token; selecting a query engine; transmitting the biometric probe and the token to the query engine; receiving the list of best matching tokens from the query engine; transmitting the list of best matching tokens to the non-anonymous sector; and receiving the decision whether to complete or cancel enrollment from the non-anonymous sector; and transmitting the decision to the query engine. The step of performing the duplicity check may comprise: generating values for templates in a templates database based on probability of matches; and generating the list of best matching tokens based on the values for each template. The method may further comprise: biometrically capturing the at least one biometric probe by a biometric client; generating the token associated with the individual; transmitting the biometric probe and the token to the query router; receiving a verification score from the query router; and granting or denying access based on the verification score.

In another embodiment of the invention, a biometric enrollment system comprises: a query engine comprising: a first processor; a first communications interface; and a first memory comprising first instructions; wherein the first instructions cause the first processor to: receive a biometric probe from the individual and a token associated with the individual; create a biometric template based on the biometric probe; and store the biometric template in association with the token; wherein the biometric token is a unique identifier which carries no demographic or biographic information. The first instructions cause the first processor to further: transmit a notification indicative of whether the creating a biometric template failed or succeeded. The biometric probe and biometric template may be based on facial recognition, iris recognition, and/or fingerprint recognition. In addition, the biometric probe and the biometric template may be based on hand geometry recognition, ten finger live scan, palm recognition, full hand recognition, signature recognition, ear recognition, finger vein recognition, retina recognition, voice recognition, DNA-based recognition or a combination thereof. The instructions may further cause the processor to perform a duplicity check on the biometric probe; send a list of best matching tokens; receive a decision whether to complete or cancel enrollment; and discard the biometric template if a cancel enrollment is received. The duplicity check comprises: generation of values for templates in a templates database based on probability of matches; and generation of the list of best matching tokens based on the values for each template. The system may further comprise a query router comprising: a second processor; a second communications interface; and a second memory comprising second instructions; wherein the second instructions cause the second processor to: receive through the second communications interface the biometric probe and the token; select a query engine; transmit through the second communications interface the biometric probe and the token to the first communication interface; receive through the second communications interface from the first communication interface the notification indicative of whether the creating a biometric template failed or succeeded; and transmit the notification through the second communications interface to a non-anonymous sector.

In an another embodiment of the invention, a non-transient computer readable storage medium comprises: a templates manager comprising instructions that cause a processor to: receive a biometric probe from the individual and a token associated with the individual; create a biometric template based on the biometric probe; and store the biometric template in association with the token; wherein the biometric token is a unique identifier which carries no demographic or biographic information. The instructions may cause the processor to further transmit a notification indicative of whether the creating a biometric template failed or succeeded. The medium may further comprise a plug-in based on facial recognition, iris recognition, and/or fingerprint recognition. In addition, the medium may further comprise a plug-in based on hand geometry recognition, ten finger live scan, palm recognition, full hand recognition, signature recognition, ear recognition, finger vein recognition, retina recognition, voice recognition, DNA-based recognition or a combination thereof. The instructions may cause the processor to further: perform a duplicity check on the biometric probe; send a list of best matching tokens; receive a decision whether to complete or cancel enrollment; and discard the biometric template if a cancel enrollment is received. The duplicity check may comprise: generation of values for templates in a templates database based on probability of matches; and generation of the list of best matching tokens based on the values for each template.

Accordingly, an advantage of the present invention is that biometric information may be managed in a platform that does not contain biographic or demographic information, thereby making the platform more reliable, faster, scalable, flexible and accurate, as well as eliminating privacy concerns.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows:

FIG. 3A illustrates a process implemented by the enrollment logic when using a normal plug-in;

FIG. 3B illustrates a process implemented by the enrollment logic when using a pass-through plug-in;

DETAILED DESCRIPTION OF PREFERRED EMBODIMENTS

Figure 1:
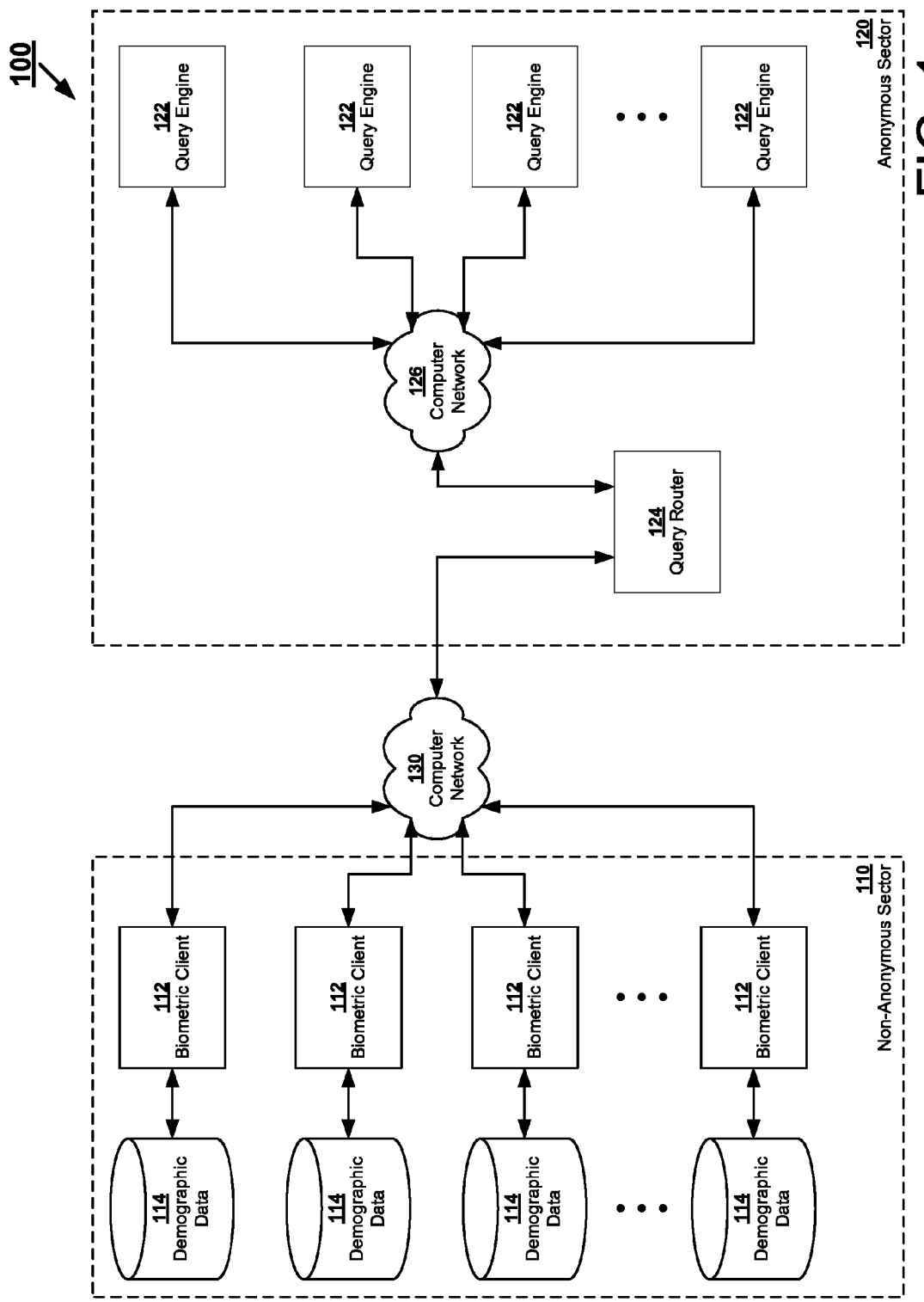
FIG. 1 illustrates an anonymous biometric identity management infrastructure according to an embodiment of the invention.

Further features and advantages of the invention, as well as the structure and operation of various embodiments of the invention, are described in detail below with reference to the accompanying FIGS. 1-7, wherein like reference numerals refer to like elements. Although the invention is described in the context of implementing three types of biometrics (face, fingerprint, and iris biometrics), one of ordinary skill in the art recognizes that any type and number of biometrics may be implemented.

To address privacy concerns, the present invention provides an anonymous biometric enrollment system and method. "Anonymous biometric verification" refers to the biometric identity confirmation without knowledge or disclosure of any biographic, demographic, or otherwise identifying information of a subject individual. As will be used herein, "biometric authentication" refers to the process of uniquely recognizing humans based upon one or more intrinsic physical or behavioral traits. "Biometric modality" refers to the inclusion of different categories and/or types of biometric identifiers. "Multimodal biometric" refers to the use of multiple types of biometric identifiers. See, e.g., U.S. Pat. Nos. 7,596,246 and 7,362,884, the entire disclosures of which are incorporated by reference herein. "Biometric verification" refers to the user of biometric authentication to confirm the identity of a person. "Biometric identification" refers to the use of biometric authentication to identify a person among a biometrically enrolled population. "Anonymous biometric identification" refers to the use of biometric authentication to identify a person among a biometrically enrolled population without knowing or disclosing any biographic, demographic, or otherwise identifying information of the subject individual. See, e.g., United States Patent Application Publication No. 2002/0112177, the entire disclosure of which is incorporated by reference herein. "Biometric enrollment" refers to the act of creating and storing biometric data (templates) from captured biometric images or other biometric data for the purpose of biometric authentication (i.e. verification and/or identification). "Biometric probe" refers to a captured biometric that is used to compare and match against a prior biometric enrollment. "Biometric score (or match score)" refers to a probability score that a given biometric enrollment and a given biometric probe represent the same identity. "Biometric fusion score" refers to a probability score that multiple biometric enrollments of one or more biometric modalities match multiple biometric probes of the same modalities. The scores of each modality have been normalized and combined (i.e. fused) to create a single probability score. "Biometric capture" refers to the act of using a biometric input device or system to capture biometric data in the form of images, templates, or other form. "Anonymous biometric authentication token" refers to a unique identifier that has no intrinsic/explicit relationship to either biographic or biometric data, but can be used to isolate the specific biometric data for matching and/or analysis. "Identity management application" refers to a system for managing and/or integrating the management of both biographic/demographic and biometric data. "Biometric data" refers to information that is used to verify or identify a person based on physical traits or behaviors. Examples of biometric data include, but are not limited to images of fingerprints, faces (2-D or 3-D), irises, and binary data generated by biometric algorithms that are used for biometric enrollment, identity verification, and identification. "Biometric template" refers to a piece of binary data generated by a biometric algorithm that is used to compare one biometric against another. "Biographic and demographic data" refers to non-biometric data that intrinsically identifies a person. Examples of biographic data include name(s), height, weight, birthdate, race/color, hair color, etc. Examples of demographic data include current location, location of origin, etc.

FIG. 1 illustrates an anonymous biometric identity management infrastructure 100 (ABIMI) according to an embodiment of the invention. The ABIMI 100 is divided into two different sectors. The first sector is a non-anonymous biometric identity management sector 110 implemented by an existing company or organization such as, but not limited to banks, hospitals, hotels, retailers, or security or military entities. The second sector is an anonymous biometric identity management 120. Anonymous sector 120 is responsible for the management of a biometric database, but in the absence of biographic or demographic data. Anonymous sector 120 is responsible for receiving biometric data and enrolling it in the biometric database, validating it and/or identifying it against known biometric data in the biometric database. Anonymous sector 120 may represent an entity completely distinct from entities within non-anonymous sector 110.

The non-anonymous biometric identity management sector 110 comprises biometric clients 112, which may be any type of computer having installed thereon a suitable operating system and biometric software, preferably implemented in a client software development kit (SDK). Each biometric client 112 is associated with already stored demographic data 114 that can be managed individually for each biometric client 112 or centrally by an identity management system (not shown).

Biometric clients 112 are in communication with a query router 124 through a computer network 130, which may be a public computer network such as, but not limited to the Internet or a private network such as a wide area network (WAN), local area network (LAN), wireless local area network (WLAN), or any combination thereof. One of ordinary skill in the art recognizes that these networks are exemplary and any type of network may be implemented. Computer network 130 may also be referred to as a "cloud network."

Query router 124 may be implemented as a computer having installed thereon a suitable operating system and biometric software programmed to the present invention. Query router 124 communicates with a plurality of query engines 122 through a suitable computer network 126. Computer network 126 can be a public network or a private network or combination thereof; it may further include secure tunnels over a public network such as a virtual private network (VPN), the implementation of which is apparent to one of ordinary skill in the art. Query router 124 is in communication with non-anonymous sector 110 through computer network 130. Query router 124 is an optional element of the ABIMI 100 and is advantageous to support hardware scalability. The query router 124 will route a query (in whole or in part) to one or more appropriate query engines 122 to execute a query (i.e. matching and/or enrollments). The query engine(s) 122 may or may not be on the same physical or virtual machine as the query router 124. In an another embodiment of the invention, the query router 124 is not present in the ABIMI 100—queries can be transmitted direct to a query engine 122, or even the underlying template data manager as discussed below.

Query router 124 receives service-oriented architecture (SOA) calls from the biometric clients 112 and then routes those requests to the appropriate query engines 122, depending on the biometric type or work load on the query engines 122. Multiple query engines 122 are preferable when using multiple physical or virtual machines to support scalability of population and/or improve system performance. Query router 124 monitors the activities of the query engines 122 and combines their responses (success/fail) into a single SOA response which is sent back to the requesting biometric client 112. Each query engine 122 converts biometric images into templates and has an associated cache (not shown), which is preferably implemented in physical memory. Query engine 122 communicates with query router 124 and moves templates into and out of cache. Each query engine 122 may also support a plurality of caches.

The SOA calls can be implemented in a variety of technologies, the identification and implementation of which are known to one of ordinary skill in the art. For example, SOA calls may be implemented as remote procedure calls (RPC) over simple object access protocol (SOAP), representational state transfer (REST), distributed component object model (DCOM), common object request broker architecture (CORBA) and data distribution service (DDS). The information can be carried over a variety of application level protocols including, but not limited to hypertext transfer protocol (HTTP), secure HTTP (HTTPS), and file transfer protocol (FTP).

Query router 124 may configure query engines 122 in a group for striped or mirrored operation. In striped operation, templates are cached in a striped or distributed fashion across the query engines 122 of the group. Each query engine 122 caches only part of templates of the group. Query router 124 distributes the templates to query engines 122 based upon a load balancing scheme that maintains the number of templates cached by each query engine 122 approximately equal. Meanwhile, in the mirrored configuration, the templates are mirrored across the entire query engine 122 group. Each query engine 122 would cache every template assigned to the group. In the mirrored configuration, query router 124 instructs a single query engine 122 to execute a search without having to queue search requests.

Figure 2:
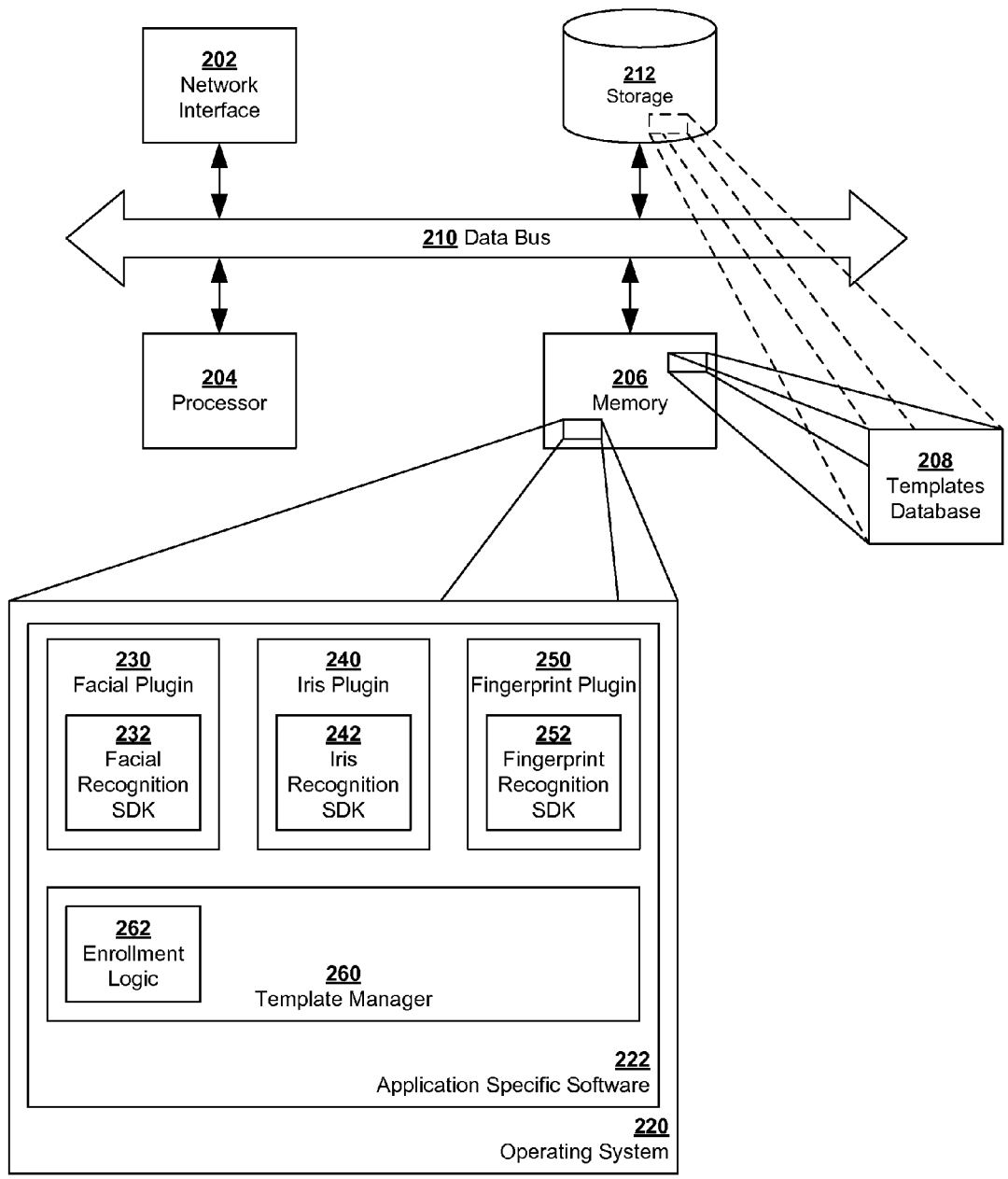
FIG. 2 illustrates a block diagram of the query engine shown in FIG. 1 according to an embodiment of the invention.

FIG. 2 illustrates a block diagram of the query engine 122 according to an embodiment of the invention. Generally, query engine 122 comprises a communications interface (shown as network interface 202), processor 204, memory 206 and optionally mass storage 212 which all communicate using one or more data buses 210, which can include internal data buses, external serial buses, universal serial bus (USB), peripheral component interconnect (PCI) bus, serial advanced technology attachment (SATA), and/or external SATA (eSATA), the implementation of which is apparent to one of ordinary skill in the art.

The communications interface 202 is used to interface query engine 122 to external devices such as the query router 124. In the depicted example, the interface is shown as network interface 202 such as a network interface card (NIC). Network interface 202 can be configured to carry data using the internet protocol (IP) with transmission control protocol (TCP) or user datagram protocol (UDP) and can be based on any number of data link protocols including but not limited to Ethernet, point-to-point protocol (PPP), high-level Data link control (HDLC) and advanced data communication control protocol (ADCCP). Alternatively or in addition, the communications interface can include other forms of inter-device communications including but not limited to universal serial bus (USB), IEEE-1394 (Firewire), eSATA, and/or high-definition multimedia interface (HDMI).

Mass storage 212 can comprise any number of storage media including but not limited to a hard disk drive, solid state drive, flash memory, and or optical storage media. Mass storage 212 is used to supplement memory 206 and is often configured with files in a file system, but may also provide storage for virtual memory as an extension of memory 206.

Processor 204 can be any device for executing instructions, particularly instructions stored in memory 206. Processor 206 can comprise any commercially available processor such as a central processor unit (CPU), floating-point processor unit (FPU), graphics processing unit (GPU), a multicore processor, a microprocessor (either in the form of a microchip or chip set), a macroprocessor, or generally any device for executing software instructions. Or processor 206 can comprise a custom made processing device such as one made from a programmable logic array (PLA), field programmable gate array (FPGA), application specific integrated circuit (ASIC), solution on a chip (SOC), or combination thereof.

Memory 206 can comprise any one or combination of volatile memory elements such as random access memory (RAM) (for example, dynamic RAM (DRAM), static RAM (SRAM), synchronous dynamic RAM (SDRAM), double data rate (DDR) RAM, etc.) and/or nonvolatile memory elements such as read only memory (ROM, flash memory, hard drive, tape, optical media, etc.). In addition, memory 206 can comprise various components such as program memory for storing processor instructions, data memory for storing data used by the processor 204, and/or various levels of caches. It should be noted that mass storage 212 and memory 206 can share much of the same functionality, for example, program instructions can be stored both in mass storage 212 and read into memory 206 as the processor executes the program instructions. Therefore, one of ordinary skill in the art should note that though described separately in this embodiment, memory 206 can perform any function described for mass storage 212.

The software in memory 206 can include one or more separate programs, each of which includes an ordered listing of executable instructions for implementing logical functions. Typically, the software in memory 206 which may initially be stored in mass storage 212, read into memory 206 for execution by processor 204, and can include operating system 220. Executing within the operating system is application specific software 222. It should be noted, however, that the modules within application specific software 222 can be implemented in software, hardware or a combination of software and hardware. In addition to controlling and executing application specific software 222, operating system 220 can be configured to manage hardware resources including but not limited to input-output control, file and data management, memory management, communications controls and provide software services including but not limited to control the execution of other computer programs, scheduling, and inter-process communications.

Template database 208 can be implemented either directly in memory 206 or stored in mass storage 212. Template database 208 stores biometric templates which have been previously enrolled.

In query engine 122, application specific software 222 comprises template manager 260 and one or more biometric modules which can be implemented as a plug-in module. A plug-in module is a common interface to template manager 260. By using a plug-in module, only a minor change to application specific software 222 is needed to add additional biometric modules to the query engine. Often, biometric capabilities are provide by means of software development kits (SDK) which are typically proprietary applications provide by third parties. SDKs can be converted to a plug-in module by wrapping the application program interfaces (API) provide by the SDK into the common interface to template manager 260.

Application specific software 222 can also be provided and stored on a non-transient storage medium either for distribution or retrieval for execution by the processor when needed.

More specifically, in FIG. 2, these biometric modules are depicted as facial recognition plug-in 230, iris recognition module plug-in 240, and fingerprint recognition module 250. Facial recognition plug-in 230 can comprise facial recognition SDK 232, which can be adapted to compare facial biometric templates and return a score that represents the degree of similarity of the templates. Iris recognition plug-in 240 can comprise iris recognition SDK 242, which can be adapted to compare iris biometric templates and return a score that represents the degree of similarity of the templates. Fingerprint recognition plug-in 250 can comprise fingerprint recognition SDK 252.

Biometric module plug-ins can be classified as either "normal" plug-ins or "pass-through" plug-ins. A normal plug-in is supplied probe and enrolled templates and returns a score based on the comparison between the probe and enrolled templates. This can be implemented by the wrapper functions within the plug-in providing the probe and enrolled templates to the underlying SDK for comparison and scoring and receiving scores from the underlying SDK. A pass-through plug-in receives enrollment templates during enrollment and only probe templates during verification or comparison. Essentially, all data is passed through directly to the underlying SDK. The primary difference between the two types of plug-ins is that in a normal plug-in biometric templates are stored in templates database 208 and retrieved by template manager 260 and provided to the plug-in for comparison and scoring and in a pass-through plug-in all information is passed through to the pass-through plug-in and the biometric templates are not stored in templates database 208 rather storage of the templates relies on the pass-through plug-in and in particular any underlying proprietary recognition module often provided in the form of an SDK. In the previous example, facial and iris recognition are commonly implemented as a normal plug-in and fingerprint recognition is commonly implemented as a pass-through plug-in.

Template manager 260 manages the templates database 208 where biometric templates are stored and retrieved for searches. Template manager 260 can also determine which plug-in module is to be used. Template manager 260 can further comprise enrollment logic 262.

Figure 3A:
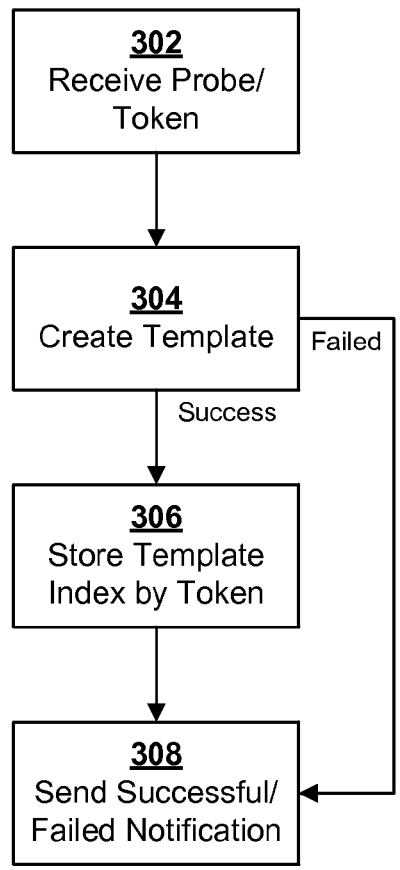

More specifically, enrollment logic 262 is used to register a given biometric probe with a new token. FIG. 3A illustrates a process implemented by the enrollment logic 262 when using a normal plug-in. At step 302, query engine 122 receives, through the communications interface, biometric data (probe) and a unique authentication identifier (henceforth referred to as a token) from non-anonymous sector 110 either directly or through query router 124. At step 304, algorithms are used to create matching data based on the biometric data received, forming a biometric template. At step 306, the generated template is stored according to the given token into templates database 208. For example, a physical location can be associated with the token. At step 308, successful enrollment notification is sent back via the communications interface. If the algorithms are unsuccessful in creating the biometric matching data at step 304, step 306 is skipped and a failed enrollment notification is sent back.

Figure 3B:
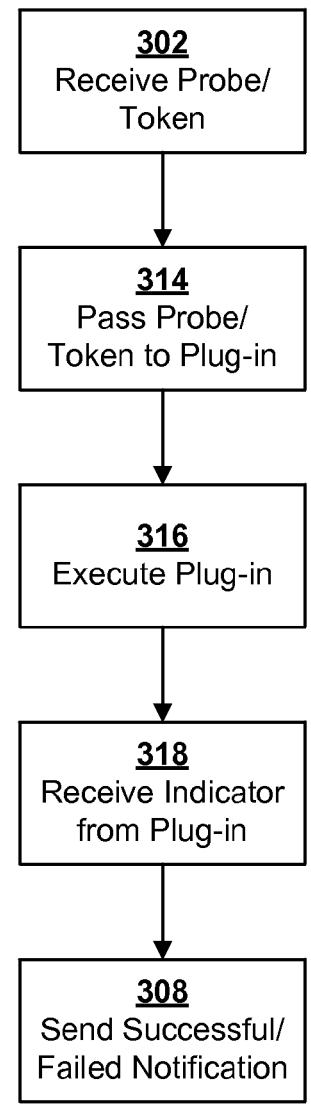

FIG. 3B illustrates a process implemented by the enrollment logic 262 when using a pass-through plug-in. At step 302, query engine 122 receives, through the communications interface, biometric data (probe) and a token from non-anonymous sector 110 either directly or through query router 124. At step 314, the probe(s) and token are passed through to the biometric module plugin. At step 316, the plug-in is executed to perform an enrollment. The plug-in forms a biometric template from the biometric data and associates it with the given token for later retrieval. The plug-in essentially performs the steps described in steps 304 and 306 described for FIG. 3A. At step 318 an enrollment indicator is received from the plug-in. At step 308, a successful or failed enrollment notification is sent back via a communications interface depending on the results of the enrollment indicator.

Figure 3C:
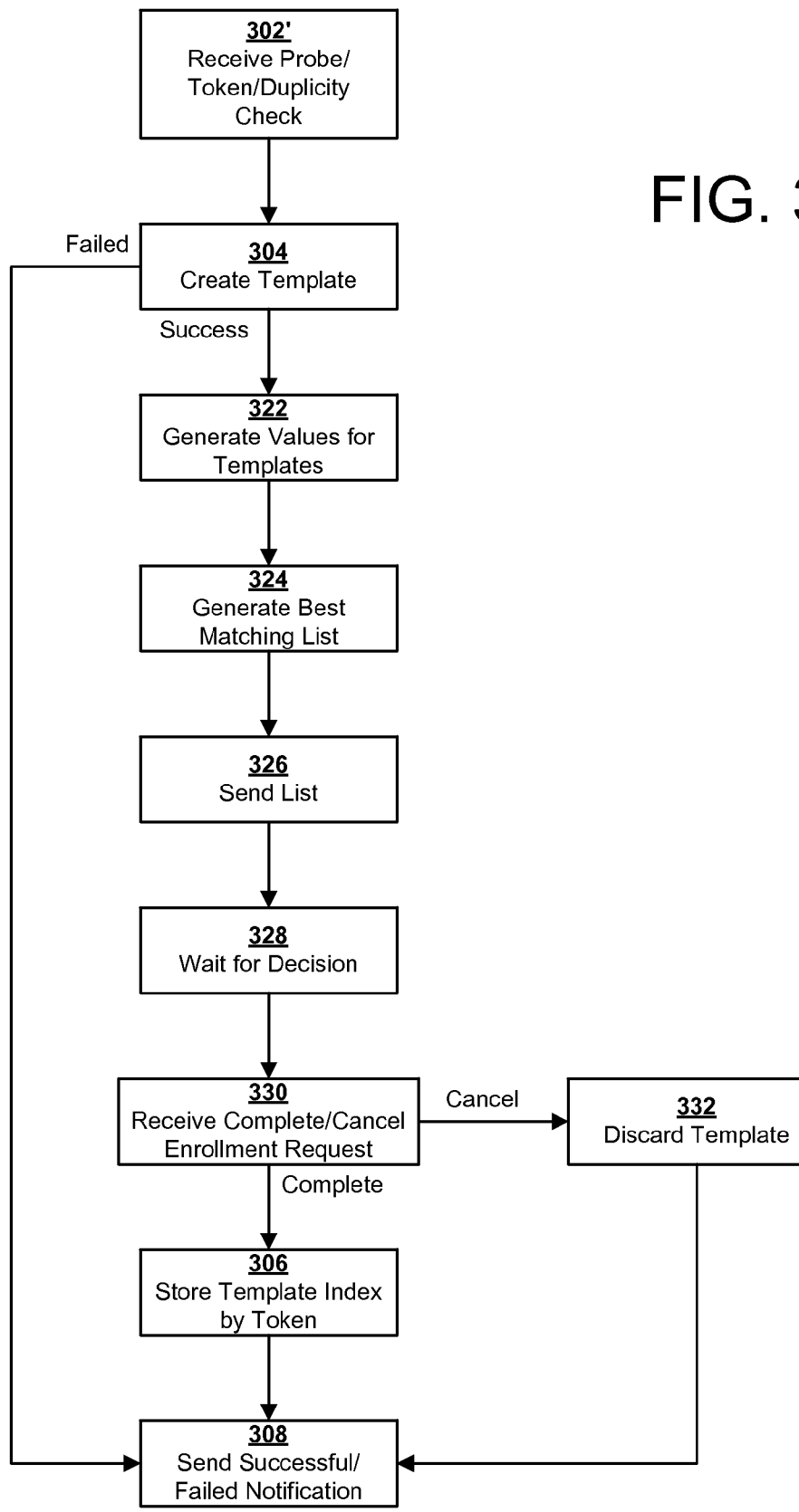
FIG. 3C illustrates an alternative process implemented by the enrollment logic where a duplicity check is performed.

FIG. 3C illustrates an alternative process implemented by the enrollment logic 262 where a duplicity check is performed. For clarity, the separation between the work inside and outside the plug-in is not distinguished as the enrollment logic 262 performs the described steps whether or not the work is done inside the plug-in (as in the pass-through plug-in) or outside the plug-in (as in the normal plug-in). At step 302', query engine 122 receives, through the communications interface, biometric data and a token with a duplicity check request from non-anonymous sector 110 either directly or through query router 124. Alternatively, the duplicity check request could be implicit in all enrollment requests. At step 304, algorithms are used to create matching data based on the biometric data received, forming a biometric template. At step 322, query engine 122 generates a value for each template stored in template database 208. The value generated is directly proportional to the probability that the new biometric template matches the stored biometric template. At step 324, query engine 122 generates a list including the highest values is generated at step 322. At step 326, the list of tokens, along with the values, corresponding to users to whom that biometric template may belong is sent back. At step 328, query engine 122 waits for a decision from non-anonymous sector 110. At step 330, a complete enrollment request or cancel enrollment request is received by query engine 122. If a cancel enrollment is received, at step 332 the template is discarded and a failed enrollment notification is sent back at step 308. If a complete enrollment request is received, at step 306 the template is stored indexed by or associated with the token into templates database 208 as described above in FIG. 3A. At step 308 a successful enrollment notification is sent.

Figure 4:
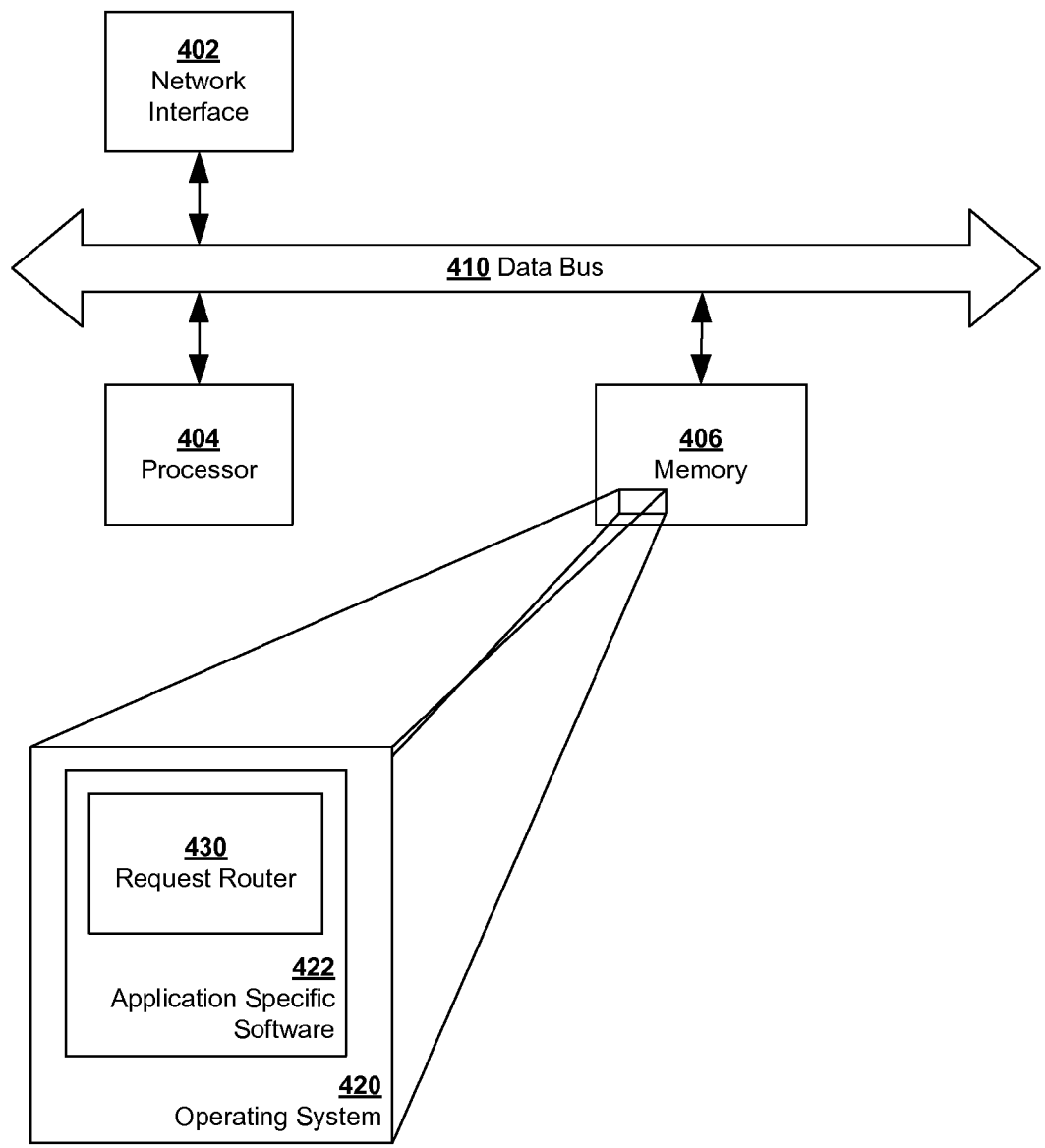
FIG. 4 illustrates the query router according to an embodiment of the invention.

FIG. 4 illustrates the query router 124 according to an embodiment of the invention. Generally, query router 124 comprises a communications interface (shown as network interface 402), processor 404, and memory 406 which all communicate using one or more data buses 410.

The communications interface is used to interface query engine 122 to external devices such as a query engine or to the non-anonymous sector. In the depicted example, the interface is shown as network interface 402 such as a NIC card. Network interface 402 can be configured to carry data using the IP protocol with TCP or UDP and can be based on any number of data link protocols including but not limited to Ethernet, PPP, HDLC and ADCCP. Alternatively or in addition, the communications interface can include other forms of inter-device communications including but not limited to USB, Firewire, eSATA, and/or HDMI. Multiple communications interfaces can be used for example a network interface could be used to communicate with the non-anonymous sector and an alternate communications interface such as USB could be used to communicate to the query engines.

Processor 404 can be any device for executing instructions, particularly instructions stored in memory 406. Processor 404 can comprise any commercially available processor such as a CPU, FPU, GPU, a multicore processor, a microprocessor (either in the form of a microchip or chip set), a macroprocessor, or generally any device for executing software instructions. Or processor 404 can comprise a custom made processing device such as one made from a PLA, FPGA, ASIC, SOC, or combination thereof.

Memory 406 can comprise any one or combination of volatile memory elements such as RAM (for example, DRAM, SRAM, SDRAM, DDR RAM, etc.) and/or nonvolatile memory elements such as read only memory (ROM, flash memory, hard drive, tape, optical media, etc.). In addition, memory 406 can comprise various components such as program memory for storing processor instructions, data memory for storing data used by the processor 404, and/or various levels of caches.

The software in memory 406 can include one or more separate programs, each of which includes an ordered listing of executable instructions for implementing logical functions. Typically, the software in memory 406 can include operating system 420. Executing within the operating system is application specific software 422. It should be noted, however, that the modules within application specific software 422 can be implemented in software, hardware or a combination of software and hardware. In addition to controlling and executing application specific software 422, operating system 420 can be configured to manage hardware resources including, but not limited to input-output control, file and data management, memory management, communications controls and provide software services including but not limited to control the execution of other computer programs, scheduling, and inter-process communications.

In query router 124, application specific software 422 comprises request router 430 which receives SOA calls from biometric clients 102 in non-anonymous sector 110 and routes the request to the appropriate query engine based on the client of origin, type of biometric data, token specific information, and query engine workload. Application specific software 422 also comprises biometric software (not shown).

Application specific software 422 can also be provided and stored on a non-transient storage medium either for distribution or retrieval for execution by the processor when needed.

Figure 5A:
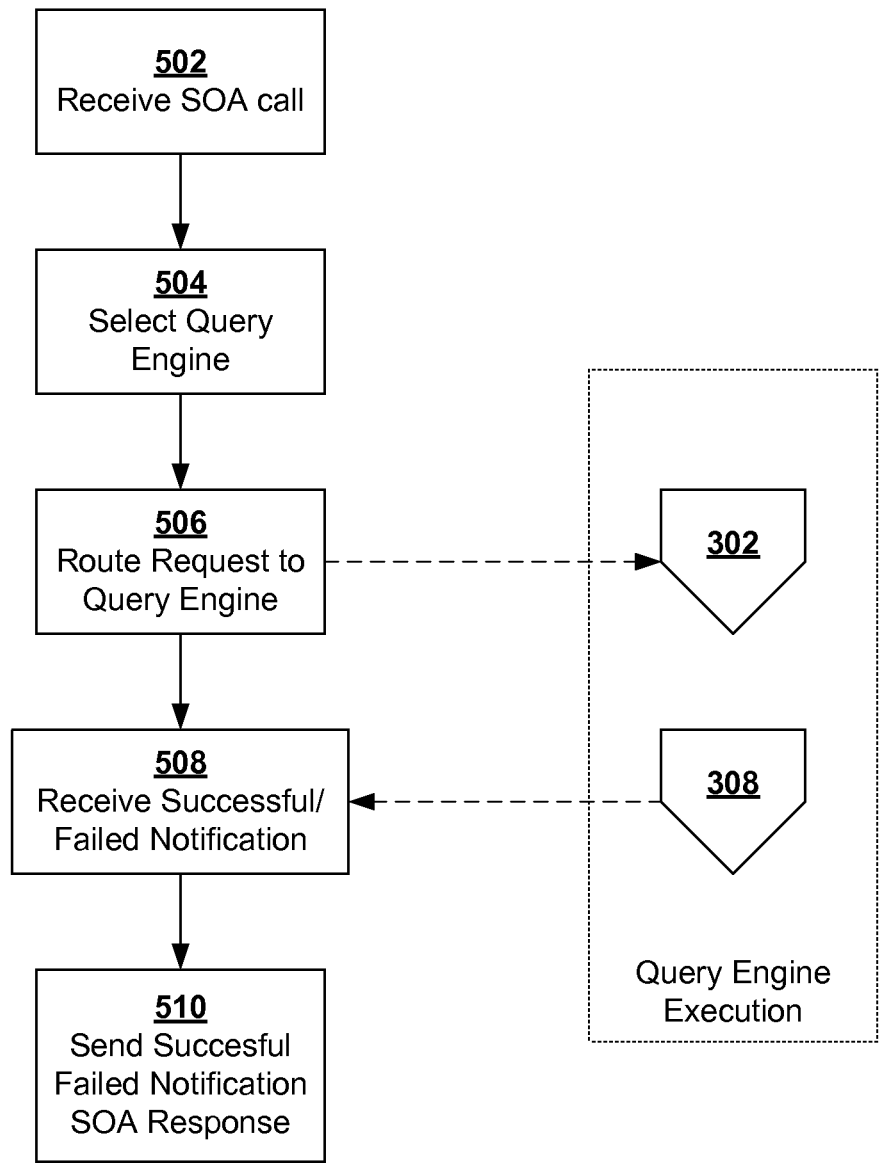
FIG. 5A illustrates a process implemented by the request router logic for routing enrollment requests.

FIG. 5A illustrates a process implemented by the request router logic for routing enrollment requests. At step 502, query router 124 receives one or more SOA calls containing biometric data and token, from a biometric client or enrollment authority as an enrollment request (to distinguish it from a verification request). At step 504, a query engine is selected based on the client of origin, type of biometric data, token specific information, and/or query engine workload. At step 506, the enrollment request is routed to the selected query engine (which executes step 302 on the query engine). At step 508, the successful/failed enrollment notification is received from the query engine (which may be resultant from step 308 on the query engine); and at step 510, the successful/failed enrollment notification is routed back to the biometric client or enrollment authority as an SOA response.

Figure 5B:
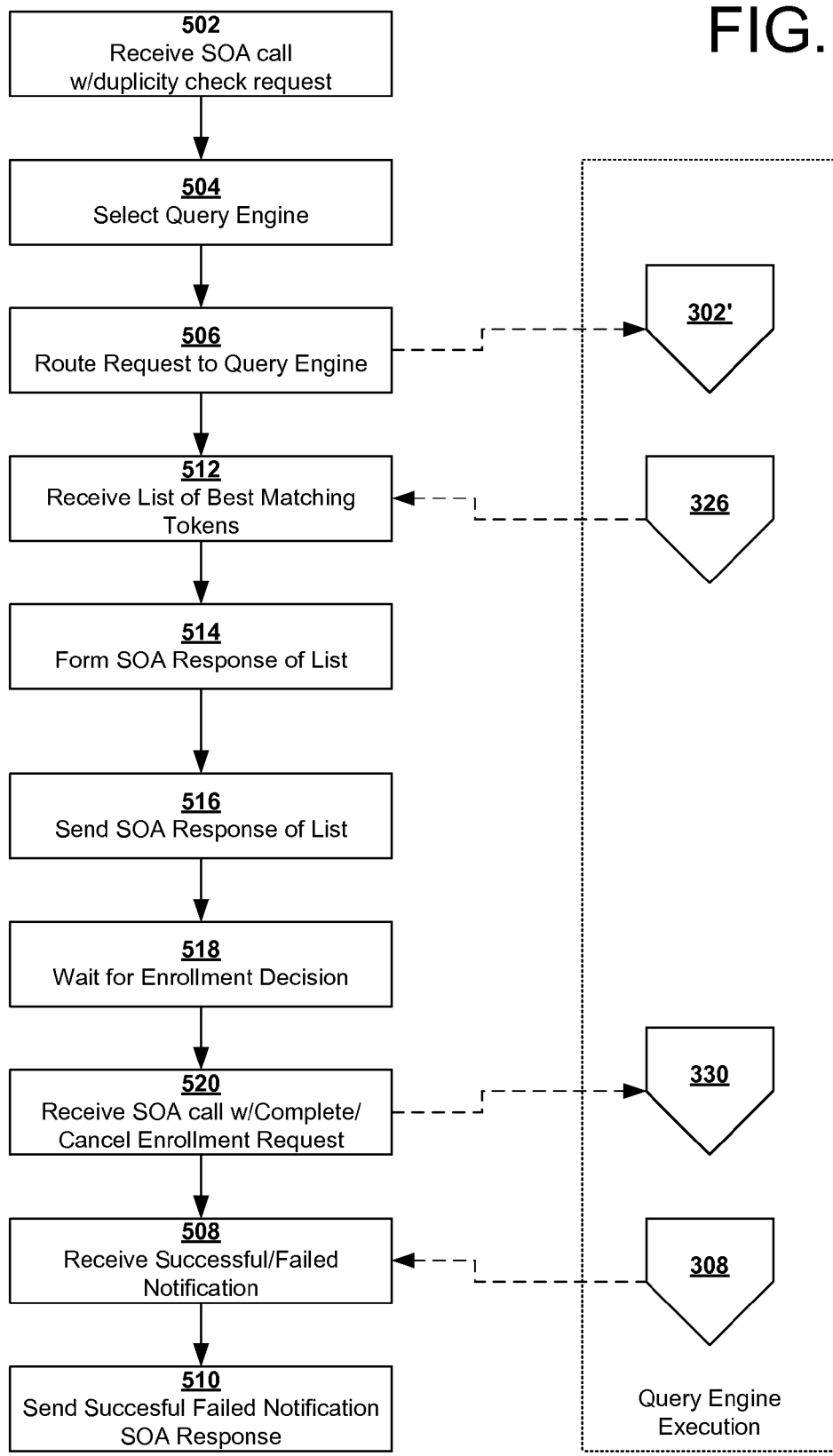
FIG. 5B illustrates an alternative process implemented by the request router logic for routing enrollment requests including duplicity check requests.

FIG. 5B illustrates an alternative process implemented by the request router logic for routing enrollment requests including duplicity check requests. At step 502', query router 124 receives one or more SOA calls containing biometric data and token, from a biometric client or enrollment authority as an enrollment request with duplicity check. Steps 504 and steps 506 are as described above in FIG. 5A. At step 512, a list of tokens along with an associate probability value is received from the selected query engine(s). In the event more than one query engine were selected, the list received from each is combined into a single list, perhaps discarding some of the least probably entries. At step 514, the list of tokens is formatted as an SOA response and routed back to the biometric client or enrollment authority. At step 516, query router 124 awaits a decision by the biometric client or enrollment authority. At step 518, query router 124 receives a complete enrollment request or cancel enrollment request. At step 520 the complete/cancel enrollment request is relayed to the selected query engine. At step 508, the successful/failed enrollment notification is received from the query engine (which may be resultant from step 308 on the query engine); and at step 510, the successful/failed enrollment notification is routed back to the biometric client or enrollment authority as an SOA response. In one embodiment when multiple query engines were selected, the complete enrollment request may be issued to only one query engine the complete enrollment request and cancel enrollment request to prevent duplicative storage (especially when operating in a striped mode). Query router 124 then would form a failed enrollment notification if all query engines send a failed enrollment notification. If a successful enrollment notification is received from the one query engine that received the complete enrollment request, the enrollment is successful as the other query engines would send a failed enrollment notification.

Figure 6:
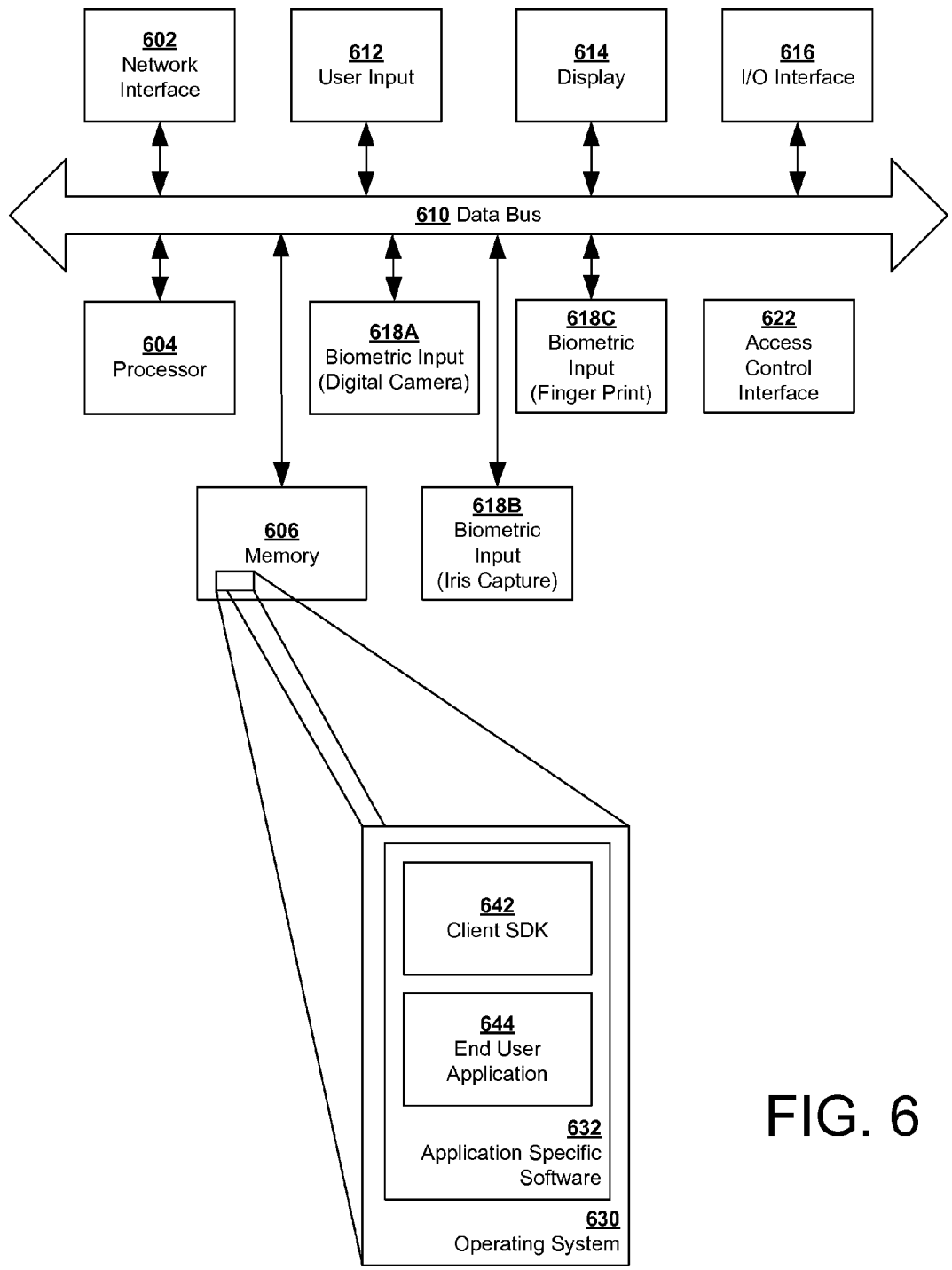
FIG. 6 illustrates the biometric client according to an embodiment of the invention.

FIG. 6 illustrates the biometric client 112 according to an embodiment of the invention. Generally, query router 102 comprises a communications interface (shown as network interface 602), processor 604, and memory 606, 110 interface 616 which provides communication to and from demographic data 114, and a biometric input devices (e.g., 618A, 618B, 618C). Optionally, biometric client 112 can further comprise display 614, user input 612, such as a pinpad, keypad, keyboard, mouse, etc. and access control interface 622, which is used to communicate to an access control device such as an automatic door lock.

The biometric client 112 also comprises one or more data buses 610 which facilitate the communications between the aforementioned components. The data buses can include internal data buses, external serial buses, USB, PCI bus, SATA, eSATA, etc., or combination thereof. For example, the processor and memory could communicate using an internal data bus, but the processor and a biometric input capture device could communicate using USB.

Biometric input devices can include commercially available biometric input and capture devices, such as digital camera 618A for capturing facial images, fingerprint scanner 618B and iris image capture device 618C. Capture devices generally may include 2D face, 3D face, hand geometry, single fingerprint, ten finger live scan, iris, palm, full hand, signature, ear, finger vein, retina, DNA, and voice capture devices.

The communications interface is used to interface biometric client 112 to external devices such as a query router or to the anonymous sector in general. In the depicted example, the interface is shown as network interface 602 such as a NIC card. Network interface 602 can be configured to carry data using the IP protocol with TCP or UDP and can be based on any number of data link protocols including but not limited to Ethernet, PPP, HDLC and ADCCP. Alternatively or in addition, the communications interface can include other forms of inter-device communications including but not limited to USB, Firewire, eSATA, and/or HDMI.

Processor 604 can be any device for executing instructions, particularly instructions stored in memory 606. Processor 604 can comprise any commercially available processor such as a CPU, FPU, GPU, a multicore processor, a microprocessor (either in the form of a microchip or chip set), a macroprocessor, or generally any device for executing software instructions. Or processor 604 can comprise a custom made processing device such as one made from a PLA, FPGA, ASIC, SOC), or combination thereof.

Memory 606 can comprise any one or combination of volatile memory elements such as RAM (for example, DRAM, SRAM, SDRAM, DDR RAM, etc.) and/or nonvolatile memory elements such as read only memory (ROM, flash memory, hard drive, tape, optical media, etc.). In addition, memory 606 can comprise various components such as program memory for storing processor instructions, data memory for storing data used by the processor 604, and/or various levels of caches.

The software in memory 606 can include one or more separate programs, each of which includes an ordered listing of executable instructions for implementing logical functions. Typically, the software in memory 606 can include operating system 630. Executing within the operating system is application specific software 632. It should be noted, however, that the modules within the application specific software can be implemented in software, hardware or a combination of software and hardware. In addition to controlling and executing application specific software 632, operating system 630 can be configured to manage hardware resources including but not limited to input-output control, file and data management, memory management, communications controls and provide software services including but not limited to control the execution of other computer programs, scheduling, and inter-process communications.

In biometric client 112, application specific software 632 comprises client SDK 642 and optionally end user application 644.

Client SDK 642 that collects and formats biometric data captured by the capture device (e.g., 618A, 618B, and 618C) for transmission to the anonymous sector. The data is formatted into an SOA request. End user application 644 represents application for which the verification is required. Examples of the end user application include facility access (e.g., a fingerprint scan opens a door to a restricted area.).

Application specific software 632 can also be provided and stored on a non-transient storage medium either for distribution or retrieval for execution by the processor when needed.

Figure 7A:
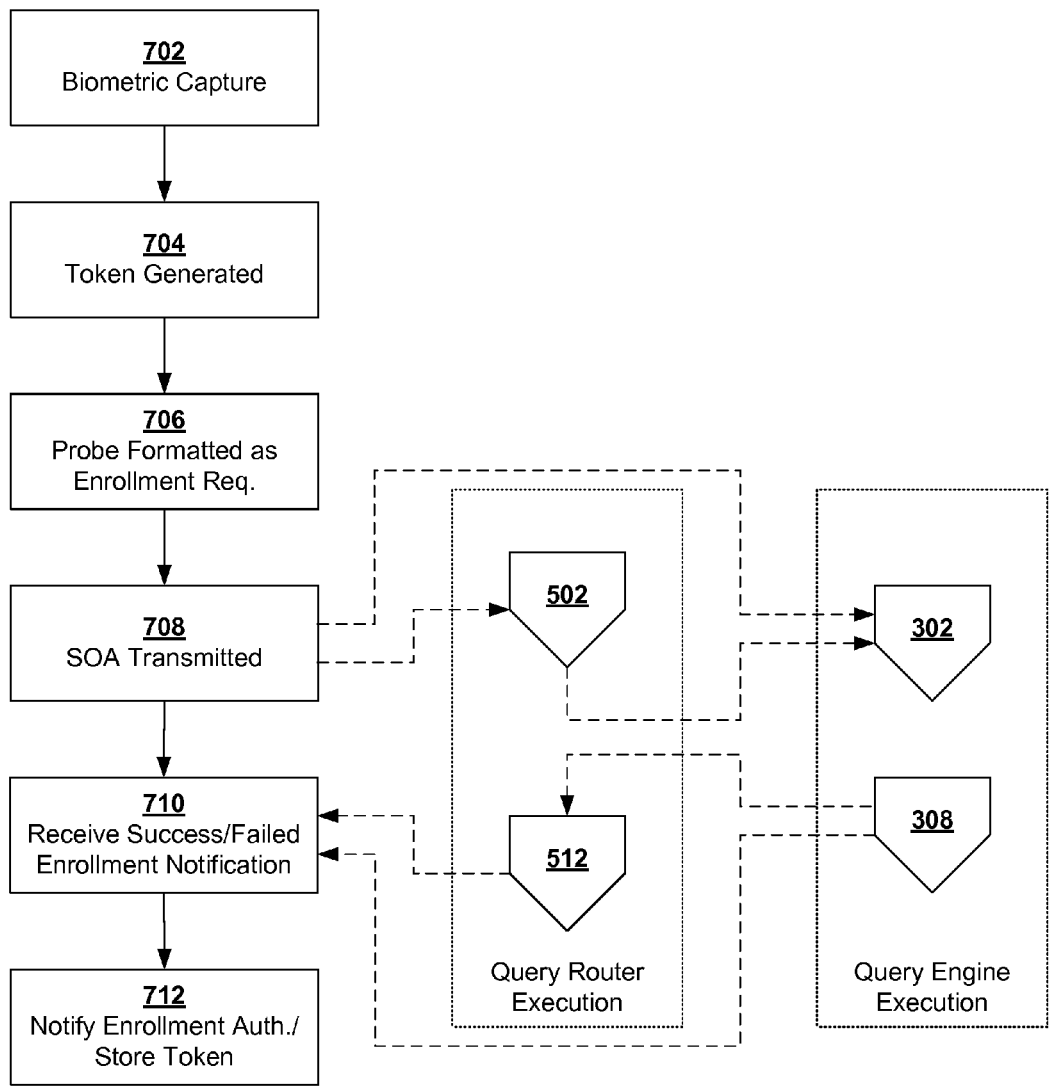
FIG. 7A illustrates a process implemented by the biometric client.

FIG. 7 illustrates a process implemented by client SDK 642 according to an embodiment of the invention. At step 702, biometric client 112 captures biometric data (probes) using one of the biometric input/capture devices (e.g. 618A, 618B and 618C). At step 704, a new user token is retrieved or generated, token may be represented as a number or a string and it may only be associated to one individual. The token itself can then be completely anonymous since it may not involve any biographic or demographic information associated to said individual. In the alternative, the token can be generated by an external enrollment authority. Subsequently, at step 706, probes are formatted as SOA enrollment requests. At step 708, the SOA calls are transmitted to the anonymous sector. It should be noted that there is no identifying information transmitted to the anonymous sector. It should be noted that there is no identifying information transmitted along with the probe to the anonymous sector. Depending on the configuration, the request is process at step 502 at a query router as depicted in FIG. 5 or at step 302 at a query engine as depicted in FIG. 3. At step 710, notification of successful or failed enrollment is received. At step 712, the enrollment authority receives the notification and the unique token is store along with the demographic/biographic information if enrollment was successful.

Figure 7B:
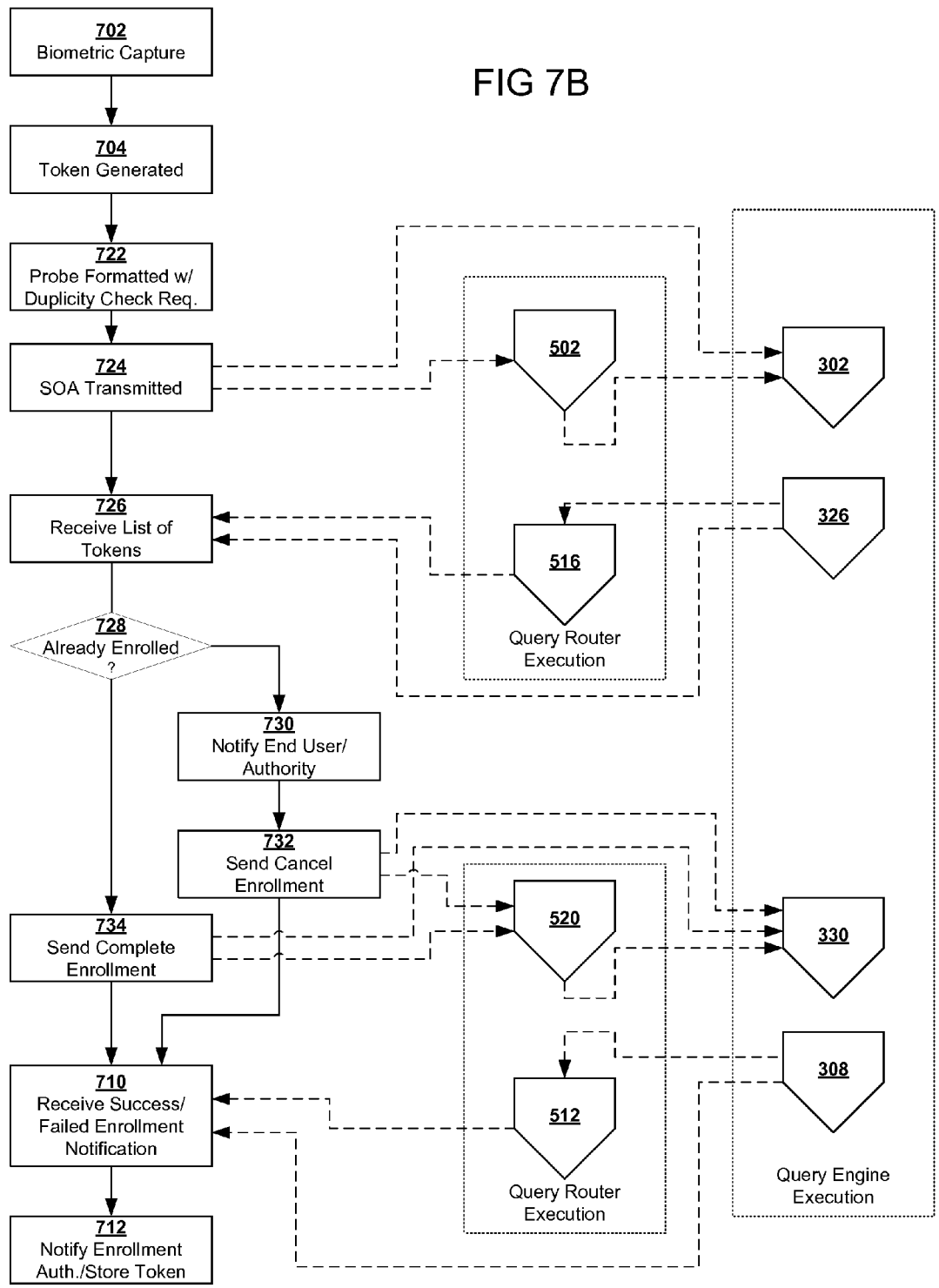
FIG. 7B illustrates an alternative process implemented by the biometric client or enrollment authority.

In an alternative embodiment corresponding to query router 124 operating in accordance to FIG. 5B and query engines operating in accordance with FIG. 3C, FIG. 7B illustrates a process implemented by the biometric client or enrollment authority. Steps 702 and 704 are as described above. At step 722, a duplicity check request is included with the probes in SOA enrollment requests. At step 724, the SOA calls are transmitted to the anonymous sector. Depending on the configuration, the request can be processed by query router 124 at step 502' or by a query engine at step 302'. At step 726, the biometric client or enrollment authority receives a list of tokens along with probability scores of users previously enrolled. At step 728, a decision is made as to whether the probabilities are high enough to ascertain whether the user was previously enrolled. If so, at step 730, a notification can be made to the end user that he/she was previously enrolled. At step 732 a cancel enrollment request is sent. If the user was not previously enrolled at step 734, a complete enrollment request. Depending on the configuration, the request can be processed by query router 124 at step 520 or by a query engine at step 330. Steps 710 and 712 proceeds as described before.

As an example of the entire enrollment process, a bank has a biographic identity management system in which a unique token is assigned to each individual client, regardless of the number of accounts that individual client holds with the bank. Additionally, clients are required to undergo a biometric enrollment when opening an account with the bank, where their biometrics are related solely to the unique token assigned to them by the financial institution and stored in the non-anonymous sector. In this example, a client wishes to open an account, and as such his or her required biometrics are captured by a biometric client which includes at least one device able to capture at least one biometric modality, for example facial recognition. The resulting probe is sent to a query router which may then queue it for processing in one or more query engine(s), where each query engine(s) contains plugins capable of processing the different modalities comprising the biometric template resulting from the probe. In this case, the query engine selected would include a facial recognition plugin. In this example no duplicity check is required and the new biometric template is stored in a template database associated with at least one query engine. The physical location of the template is associated with the unique token assigned to the user. The bank then receives notification of a completed enrollment and proceeds with remainder of the process to open an account.

It should be emphasized that the above-described embodiments are merely examples of possible implementations. Many variations and modifications may be made to the above-described embodiments without departing from the principles of the present disclosure. For example, any organization that determines that the qualities exhibited by one or more systems described in this disclosure, including but not limiting itself to: the lack of biographic and demographic information exchange over a cloud network, token based anonymous biometric identification, and distributed anonymous biometric identification engines; may implement solutions similar to the invention while maintaining its own biographic identity management system. Additionally, modalities other than irises, fingerprints, facial characteristics, and vocal characteristics may be used, so long as they may be represented in a biometric template. Note also that the systems described may comprise a plurality of sub-systems, containing one or more databases in which a plurality of biographic data and demographic data may be stored. Additionally that several combinations of the individual components of the system may fall under the scope of the invention, and one or more of the components making up the system may be able to performs the tasks of one or more other components of the system, including but not limiting itself to the following examples: a single hardware and software system may carry out the functions of both a query router and the query engine; a single plugin may be able to process two or more types of biometric modalities; biometric capture devices may be able to capture more than one biometric simultaneously; biometric clients may generate two or more biometric templates from captured biometrics; and functions carried out by the query router may instead by carried out in a biometric client, such as sorting. All such modifications and variations are intended to be included herein within the scope of this disclosure and protected by the following claims.

I claim:

1. A method of biometrically enrolling an individual anonymously, the method comprising the steps of:
   receiving at a query engine in an anonymous biometric identity management sector a biometric probe and an anonymous biometric authentication token from a non-anonymous sector, wherein the anonymous biometric identity management sector has no knowledge of or access to any biographic, demographic, or identifying information of the individual;
   creating, at the query engine, a biometric template based on the biometric probe; and
   storing, at a templates database in the anonymous biometric identity management sector, the biometric template in association with the anonymous biometric authentication token;
   wherein the anonymous biometric authentication token is a unique identifier which carries no demographic, identifying, or biographic information and is only associated to one individual.

2. The method of claim 1 further comprising:
   transmitting a notification indicative of whether the creating a biometric template failed or succeeded.

3. The method of claim 1, wherein the biometric probe and the biometric template are based on facial recognition.

4. The method of claim 1, wherein the biometric probe and the biometric template are based on iris recognition.

5. The method of claim 1, wherein the biometric probe and the biometric template are based on fingerprint recognition.

6. The method of claim 1, wherein the biometric probe and the biometric template are based on hand geometry recognition, ten finger live scan, palm recognition, full hand recognition, signature recognition, ear recognition, finger vein recognition, retina recognition, voice recognition, DNA-based recognition or combination thereof.

7. The method of claim 6 further comprising:
   biometrically capturing the at least one biometric probe by a biometric client within the non-anonymous sector;
   generating, at the non-anonymous sector, the anonymous biometric authentication token associated with the individual;
   transmitting the biometric probe and the anonymous biometric authentication token to the query router;
   receiving a verification score from the query router; and
   granting or denying access based on the verification score.

8. The method of claim 1, further comprising:
   receiving at a query router at least one biometric probe and an anonymous biometric authentication token;
   selecting the query engine;
   transmitting the biometric probe to the query engine;
   receiving the notification at the non-anonymous sector.

9. The method of claim 1, further comprising:
   performing a duplicity check on the biometric probe;
   sending a list of best matching anonymous biometric authentication tokens;
   receiving a decision whether to complete or cancel enrollment; and
   discarding the biometric template if a cancel enrollment is received.

10. The method of claim 9, further comprising:
    receiving by a query router at least one biometric probe and an anonymous biometric authentication token;
    selecting the query engine;
    transmitting the biometric probe and the anonymous biometric authentication token to the query engine;
    receiving the list of best matching tokens from the query engine;
    transmitting the list of best matching tokens to the non-anonymous sector; and
    receiving the decision whether to complete or cancel enrollment from the non-anonymous sector; and
    transmitting the decision to the query engine.

11. The method of claim 9, wherein the performing the duplicity check comprises:
    generating values for templates in a templates database based on probability of matches;
    generating the list of best matching anonymous biometric authentication tokens based on the values for each template.

12. A biometric enrollment system for biometrically enrolling an individual anonymously, the system comprising:
    a query engine in an anonymous biometric identity management sector, wherein the anonymous biometric identity management sector has no knowledge of or access to any biographic, demographic, or identifying information of the individual, the query engine comprising:
       a first processor;
       a first communications interface; and
       a first memory comprising first instructions; wherein the first instructions cause the first processor to:
          receive, from a non-anonymous sector, a biometric probe and an anonymous biometric authentication token associated with the individual;
          create a biometric template based on the biometric probe; and
          store the biometric template in association with the anonymous biometric authentication token;
          wherein the anonymous biometric authentication token is a unique identifier which carries no demographic or biographic information and is only associated to one individual.

13. The system of claim 12, wherein the first instructions cause the first processor to further:
    transmit a notification indicative of whether the creating a biometric template failed or succeeded.

14. The system of claim 12, wherein the biometric probe and the biometric template are based on facial recognition.

15. The system of claim 12, wherein the biometric probe and the biometric template are based on iris recognition.

16. The system of claim 12, wherein the biometric probe and the biometric template are based on fingerprint recognition.

17. The method of claim 12, wherein the biometric probe and the biometric template are based on hand geometry recognition, ten finger live scan, palm recognition, full hand recognition, signature recognition, ear recognition, finger vein recognition, retina recognition, voice recognition, DNA-based recognition or combination thereof.

18. The system of claim 12 wherein the first instructions cause the processor to further:
perform a duplicity check on the biometric probe;
send a list of best matching anonymous biometric authentication tokens;
receive a decision whether to complete or cancel enrollment; and
discard the biometric template if a cancel enrollment is received.

19. The system of claim 12, wherein the duplicity check comprises:
generation of values for templates in a templates database based on probability of matches; and
generation of the list of best matching anonymous biometric authentication tokens based on the values for each template.

20. The system of claim 12, further comprising:
a query router comprising:
a second processor;
a second communications interface; and
a second memory comprising second instructions; wherein the second instructions cause the second processor to:
receive through the second communications interface the biometric probe and an anonymous biometric authentication token;
select the query engine;
transmit through the second communications interface the biometric probe and the anonymous biometric authentication token to the first communication interface;
receive through the second communications interface from the first communication interface the notification indicative of whether the creating a biometric template failed or succeeded; and
transmit the notification through the second communications interface to a non-anonymous sector.

21. A non-transient computer readable storage medium comprising:
a template manager adapted for biometrically enrolling an individual anonymously comprising instructions that cause a processor to:
receive, at an anonymous biometric identity management sector, a biometric probe and an anonymous biometric authentication token associated with the individual, wherein the anonymous biometric identity management sector has no knowledge of or access to any biographic, demographic, or identifying information of the individual;
create a biometric template based on the biometric probe; and
store the biometric template in association with the anonymous biometric authentication token;
wherein the anonymous biometric authentication token is a unique identifier which carries no demographic or biographic information and is only associated to one individual.

22. The medium of claim 21 wherein the instructions cause the processor to further:
transmit a notification indicative of whether the creating a biometric template failed or succeeded.

23. The medium of claim 21 further comprising a plug-in based on facial recognition.

24. The medium of claim 21 further comprising a plug-in based on iris recognition.

25. The medium of claim 21 further comprising a plug-in based on fingerprint recognition.

26. The medium of claim 21 further comprising a plug-in based on hand geometry recognition, ten finger live scan, palm recognition, full hand recognition, signature recognition, finger vein recognition, retina recognition, voice recognition, DNA-based recognition or combination thereof.

27. The system of claim 21 wherein the instructions cause the processor to further:
perform a duplicity check on the biometric probe;
send a list of best matching anonymous biometric authentication tokens;
receive a decision whether to compete or cancel enrollment; and
discard the biometric template if a cancel enrollment is received.

28. The system of claim 21, wherein the duplicity check comprises:
generation of values for templates in a templates database based on probability of matches; and
generation of the list of best matching anonymous biometric authentication tokens based on the values for each template.

* * * * *